(12) United States Patent
Kuranoshita

(10) Patent No.: US 9,626,606 B2
(45) Date of Patent: Apr. 18, 2017

(54) DATA GENERATING APPARATUS, DATA GENERATING METHOD, AND NON-TRANSITORY STORAGE MEDIUM

(71) Applicant: FUJIFILM Corporation, Minato-ku, Tokyo (JP)

(72) Inventor: Masashi Kuranoshita, Minato-ku (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 14/302,672

(22) Filed: Jun. 12, 2014

(65) Prior Publication Data

US 2014/0368876 A1    Dec. 18, 2014

(30) Foreign Application Priority Data

Jun. 17, 2013 (JP) .................... 2013-126297

(51) Int. Cl.
*G06F 15/00* (2006.01)
*G06K 15/02* (2006.01)
*G06F 3/12* (2006.01)

(52) U.S. Cl.
CPC ....... *G06K 15/1856* (2013.01); *G06F 3/1204* (2013.01); *G06F 3/125* (2013.01); *G06F 3/1243* (2013.01); *G06F 3/1282* (2013.01)

(58) Field of Classification Search
None
See application file for complete search history.

(56) References Cited

U.S. PATENT DOCUMENTS

| 2008/0259387 | A1* | 10/2008 | Hirai | 358/1.15 |
| 2009/0116068 | A1* | 5/2009 | Reichhart | B41F 33/00 |
| | | | | 358/1.18 |
| 2009/0268232 | A1* | 10/2009 | Niblett, Jr. | G06F 3/1208 |
| | | | | 358/1.15 |
| 2011/0007360 | A1* | 1/2011 | Kuranoshita | G06F 3/1204 |
| | | | | 358/1.18 |
| 2011/0096356 | A1* | 4/2011 | Giannetti | 358/1.15 |
| 2011/0261412 | A1* | 10/2011 | Nakatsuka | G06F 3/1205 |
| | | | | 358/1.18 |

FOREIGN PATENT DOCUMENTS

| JP | 2007-130947 A | 5/2007 |
| JP | 2009-279827 A | 12/2009 |
| JP | 2010-157099 A | 7/2010 |
| JP | 2010234540 A | 10/2010 |

OTHER PUBLICATIONS

Rejection of the Application, dispatched Jun. 9, 2015, issued in corresponding JP Application No. 2013-126297, 5 pages in English and Japanese.

* cited by examiner

*Primary Examiner* — Helen Q Zong
(74) *Attorney, Agent, or Firm* — Sughrue Mion, PLLC

(57) ABSTRACT

The numbers of pages making up respective records are acquired as individual page counts by analyzing page description data used for variable data printing. The maximum page count among the acquired individual page counts is determined as a common page count. Imposition data representing a common and single page layout made up of the determined common page count are generated.

6 Claims, 10 Drawing Sheets

FIG. 3

| PAGE NUMBER | RECORD NUMBER | SHEET NUMBER | F/B | R/L |
|---|---|---|---|---|
| 001 | 1 | 1 | B | R |
| 002 | | | F | L |
| 003 | | | F | R |
| 004 | | | B | L |
| 005 | | 2 | B | R |
| 006 | | | F | L |
| 007 | | | F | R |
| 008 | | | B | L |
| 009 | 2 | 3 | B | R |
| 010 | | | F | L |
| 011 | | | F | R |
| 012 | | | B | L |
| 013 | ⋮ | ⋮ | | |
| ⋮ | | | | |
| 796 | | | | |
| 797 | 100 | 200 | B | R |
| 798 | | | F | L |
| 799 | | | F | R |
| 800 | | | B | L |

80 points to RECORD NUMBER column; 82 points to F/B column.

FIG. 6

| PAGE NUMBER | RECORD NUMBER |
|---|---|
| 001 | |
| 002 | |
| 003 | |
| 004 | 1 |
| 005 | |
| 006 | |
| 007 | |
| 008 | |
| 009 | |
| 010 | |
| 011 | 2 |
| 012 | |
| 013 | |
| ⋮ | ⋮ |
| 796 | |
| 797 | |
| 798 | 100 |
| 799 | |
| 800 | |

80

84

| SHEET NUMBER | F/B | R/L |
|---|---|---|
| C1 | B | R |
| | F | L |
| | F | R |
| | B | L |
| C2 | B | R |
| | F | L |
| | F | R |
| | B | L |

DATA GENERATING APPARATUS, DATA GENERATING METHOD, AND NON-TRANSITORY STORAGE MEDIUM

CROSS-REFERENCE TO RELATED APPLICATION

This application is based upon and claims the benefit of priority from Japanese Patent Application No. 2013-126297 filed on Jun. 17, 2013, the contents of which are incorporated herein by reference.

BACKGROUND OF THE INVENTION

Field of the Invention

The present invention relates to a data generating apparatus, a data generating method, and a non-transitory storage medium for generating imposition data suitable for variable data printing.

Description of the Related Art

Recently, the work flow of printing processes has been digitized as a whole because of the widespread use of DTP (DeskTop Publishing) and CTP (Computer To Plate) processes in the printing field. In particular, various technologies about variable data printing have been proposed in the art as a process of efficiently producing a plurality of productions, e.g., the detailed statements of charges on bills, which share certain contents information.

Japanese Laid-Open Patent Publication No. 2007-130947 discloses a method of and an apparatus for generating control data for variable data printing (hereinafter referred to as "data for variable data printing") by duplicating and correcting page editing data that represent one layout unit.

SUMMARY OF THE INVENTION

A record that serves as a printing unit for data for variable data printing may be made up of not only a single page but also a plurality of pages. Further, even in one set of data for variable data printing, a different number of pages can be set depending on a record.

The method and apparatus disclosed in Japanese Laid-Open Patent Publication No. 2007-130947 do not take into account the above editing procedure for data for variable data printing. In order to deal with complex page arrangements, page layouts for records may be saved and managed altogether. However, the amount of page layout data thus saved and managed is so large that such a data handling is not preferable from the standpoint of data management and processing.

It is an object of the present invention to provide a data generating apparatus, a data generating method, and a non-transitory storage medium which are capable of generating imposition data suitable for variable data printing highly efficiently from the standpoint of data management and processing.

According to the present invention, there is provided a data generating apparatus including an individual page count acquirer for acquiring, as individual page counts, the numbers of pages making up respective records, by analyzing page description data used for variable data printing, a common page count determiner for determining, as a common page count, the maximum page count among the individual page counts acquired by the individual page count acquirer, and an imposition data generator for generating imposition data representing a common and single page layout made up of the common page count determined by the common page count determiner.

Since the maximum page count among the individual page counts is determined as a common page count, and the imposition data representing a common and single page layout made up of the common page count are generated, it is enough to handle an amount of data corresponding to one record, and the imposition data for variable data printing can be generated highly efficiently from the standpoint of data management and processing.

The imposition data generator should preferably generate the imposition data by inserting blank pages into the respective records to make up for lacking pages in a case where the individual page counts are smaller than the common page count.

The imposition data generator should preferably generate the imposition data that indicate the page layout of a plurality of signatures.

The data generating apparatus should preferably further include a sheet count calculator for calculating a minimum number of sheets by which each of the records can be printed, based on the number of pages assigned to one sheet, the total number of records, and the common page count.

According to the present invention, there is also provided a data generating method for enabling a computer to perform the steps of acquiring, as individual page counts, the numbers of pages making up respective records, by analyzing page description data used for variable data printing, determining, as a common page count, the maximum page count among the acquired individual page counts, and generating imposition data representing a common and single page layout made up of the determined common page count.

The step of generating should preferably generate the imposition data by inserting blank pages into the respective records to make up for lacking pages in a case where the individual page counts are smaller than the common page count.

The step of generating should preferably generate the imposition data that indicate the page layout of a plurality of signatures.

The data generating method should preferably further include the step of calculating a minimum number of sheets by which each of the records can be printed, based on the number of pages assigned to one sheet, the total number of records, and the common page count.

According to the present invention, there is further provided a non-transitory storage medium storing a program for enabling a computer to perform the steps of acquiring, as individual page counts, the numbers of pages making up respective records, by analyzing page description data used for variable data printing, determining, as a common page count, the maximum page count among the acquired individual page counts, and generating imposition data representing a common and single page layout made up of the determined common page count.

With the data generating apparatus, the data generating method, and the non-transitory storage medium according to the present invention, since the maximum page count among the individual page counts is determined as a common page count, and the imposition data representing a common and single page layout made up of the common page count are generated, it is enough to handle an amount of data corresponding to one record, and the imposition data for variable data printing can be generated highly efficiently from the standpoint of data management and processing.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram showing a data structure that is grasped from PDF/VT data shown in FIG. 2;

FIG. 6 is a diagram showing a data structure which has been changed from the data structure shown in FIG. 3;

DESCRIPTION OF THE PREFERRED EMBODIMENTS

A data generating method according to a preferred embodiment of the present invention in relation to a data generating apparatus and a non-transitory storage medium that stores a data generating program, for performing the data generating method, will be described in detail below with reference to the accompanying drawings.

[Overall Arrangement of Print Production System 10]

Figure 1:
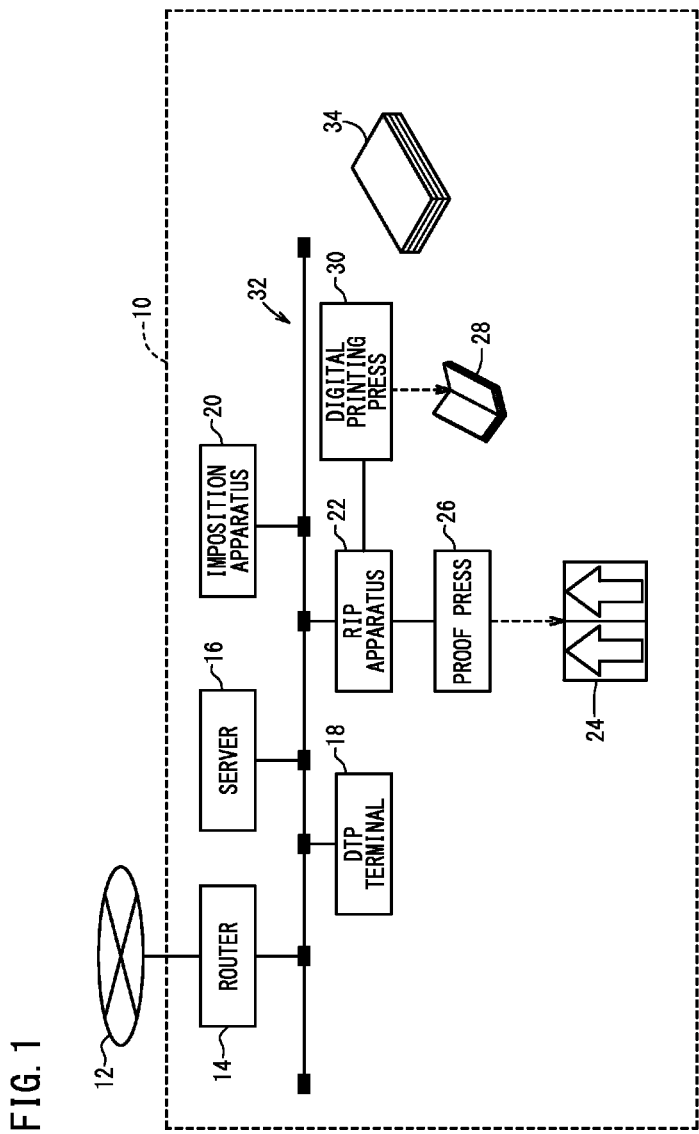
FIG. 1 is a block diagram of a print production system incorporating an imposition apparatus as a data generating apparatus according to an embodiment of the present invention.

FIG. 1 shows in block form a print production system 10 incorporating an imposition apparatus 20 as a data generating apparatus according to an embodiment of the present invention.

As shown in FIG. 1, the print production system 10 includes a router 14 serving as a relay device for connection to a network 12, a server 16 which is accessible through the network 12 from terminal devices, not shown, belonging to external networks, a DTP terminal 18 for performing DTP (DeskTop Publishing) process, including an editing process, on data acquired from the server 16, etc., an imposition apparatus 20 for imposing contents data processed by the DTP terminal 18, an RIP apparatus 22 for performing various image processing processes including a rasterizing process, a color conversion process, etc., based on output data imposed by the imposition apparatus 20, a proof press 26 for printing a proof 24 based on proofread data sent from the RIP apparatus 22, and a digital printing press 30 for producing a print 28 based on platemaking data sent from the RIP apparatus 22.

The server 16 is an apparatus that plays a central role in the workflow management in the print production system 10. The server 16 is connected to various terminal devices of at least one of designers and production companies, not shown, for communication therewith through the router 14 and the network 12. The server 16 is also connected to the DTP terminal 18, the imposition apparatus 20, and the RIP apparatus 22 for communication therewith through a LAN (Local Area Network) 32 constructed in the print production system 10.

Specifically, the server 16 is capable of performing a function as a file server for storing and transferring various data files, a function as an authorization management server for managing task authorizations that are available for terminals, users or print jobs, and a function as a mail server for generating and distributing notification mails at certain times such as process starting and ending times.

The data files that can be managed by the server 16 as the file server include contents data, printing data (e.g., platemaking data, printing plate data, or proofread data), job tickets {e.g., JDF (Job Definition Format) files}, ICC (International Color Consortium) profiles, color sample data, etc.

The DTP terminal 18 generates image data per page from contents data representing characters, figures, patterns, pictures, etc. which have been processed by a preflight process. The imposition apparatus 20 performs an imposing process according to a binding process and a page folding process which have been designated, by referring to the tag information of a job ticket.

The RIP apparatus 22 functions as a printing processing server for at least one type of printing press. In FIG. 1, the RIP apparatus 22 is connected to the proof press 26 and the digital printing press 30 for communication therewith. The RIP apparatus 22 converts data expressed in a page description language (PDL) (hereinafter referred to as "page description data") into output data suitable for output devices, and supplies the output data to the proof press 26 or the digital printing press 30.

The proof press 26 prints a proof 24 having images on a proof sheet, not shown, based on the proofread data supplied from the RIP apparatus 22. The proof press 26 may comprise a DDCP (Direct Digital Color Proofer), an ink jet color proofer, a low-resolution color laser printer (electrophotographic printer), an ink jet printer, or the like.

The digital printing press 30 produces a print 28 which has images printed on a print medium 34 without producing intermediate products such as printing plates or the like (so-called "direct printing"). The digital printing press 30 may comprise an ink jet printing press, a wide-format printing press, an ink jet color proofer, a color laser printer, or the like.

[Electric Arrangement of the Imposition Apparatus 20]

Figure 2:
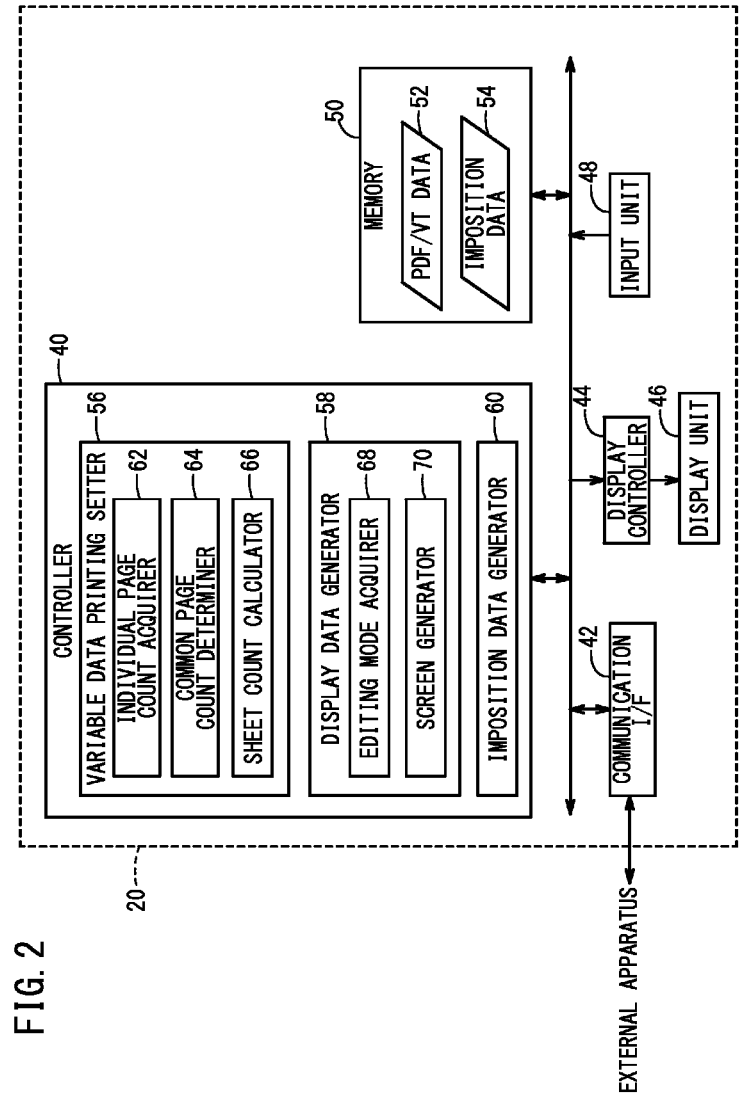
FIG. 2 is an electric block diagram of the imposition apparatus shown in FIG. 1.

FIG. 2 illustrates the imposition apparatus 20 shown in FIG. 1 in electric block form. As shown in FIG. 2, the imposition apparatus 20 basically comprises a computer having a controller 40, a communication I/F 42, a display controller 44, a display unit 46, an input unit 48, and a memory 50 (storage medium).

The communication I/F 42 is an interface (I/F) for sending electric signals to and receiving electric signals from external apparatus. Thus, the imposition apparatus 20 can acquire various data, e.g., PDF/VT data 52, from the server 16 (FIG. 1) through the communication I/F 42, and can supply various data, e.g., imposition data 54, to the server 16.

Figure 8:
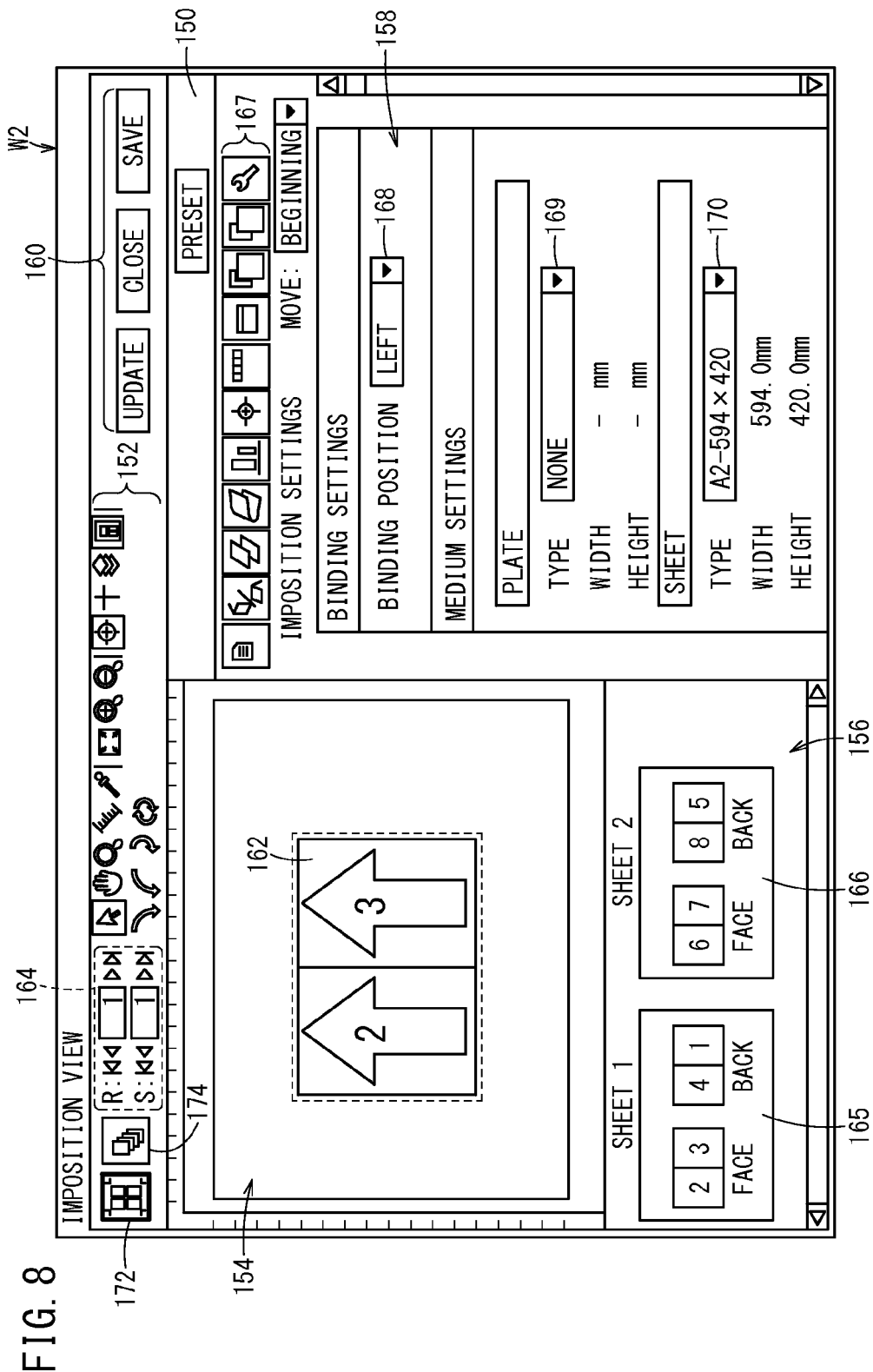
FIG. 8 is a view showing an imposition editing screen in a normal mode.
Figure 9:
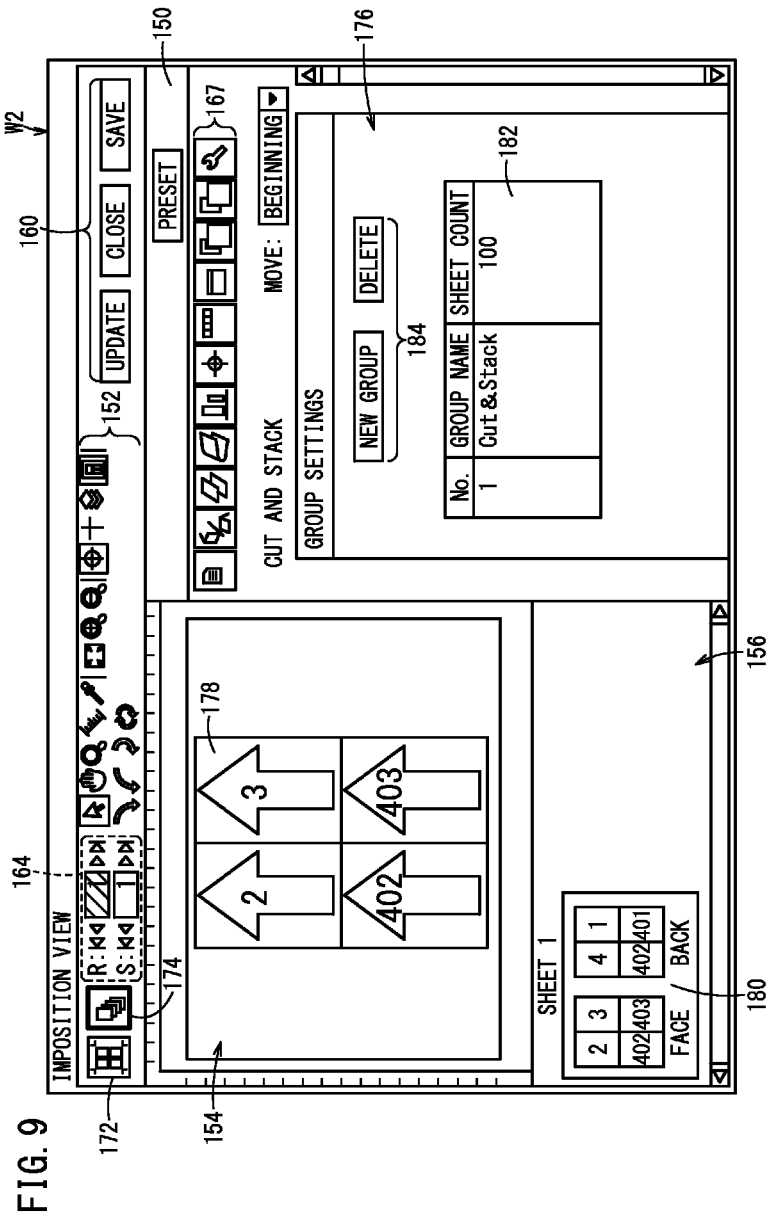
FIG. 9 is a view showing an imposition editing screen in an S & C mode.

The display controller 44 comprises a control circuit for controlling the display unit 46 under the control of the controller 40. Specifically, the display controller 44 outputs a display control signal via an I/F, not shown, to the display unit 46, whereby the display unit 46 is energized to display various images including a window W1 (FIGS. 5, 7) and a window W2 (FIGS. 8, 9).

The input unit 48 comprises various input devices including a mouse, a trackball, a keyboard, a touch sensor, etc. The display function of the display unit 46 and the input function of the input unit 48 are combined into a user interface.

The memory 50 stores programs and data which are required for the controller 40 to control various components. In FIG. 2, the memory 50 stores page description data in a PDF/VT format, hereinafter referred to as "PDF/VT data 52", and imposition data 54 in a JDF.

The memory 50 may comprise a non-transitory, computer-readable storage medium. The computer-readable storage medium comprises a portable medium such as a magnetooptic disk, a ROM, a CD-ROM, a flash memory, or the like, or a storage device such as a hard disk or the like incorporated in a computer system. The storage medium also may comprise a medium for dynamically holding programs for a short period of time, or a medium for holding programs for a certain period of time.

The controller 40 comprises a processor such as a CPU (Central Processing Unit). The controller 40 reads and executes programs stored in the memory 50 to perform the functions of a variable data printing setter 56, a display data generator 58, and an imposition data generator 60.

The variable data printing setter 56 sets various parameters about variable data printing. Specifically, the variable data printing setter 56 includes an individual page count acquirer 62 for acquiring the numbers of pages (i.e., the page counts) making up respective records (hereinafter referred to as "individual page counts"), a common page count determiner 64 for determining a number of common pages, or, a common page count, from the respective individual page counts, and a sheet count calculator 66 for calculating a number of sheets, or a sheet count, suitable for cut and stack.

Figure 5:
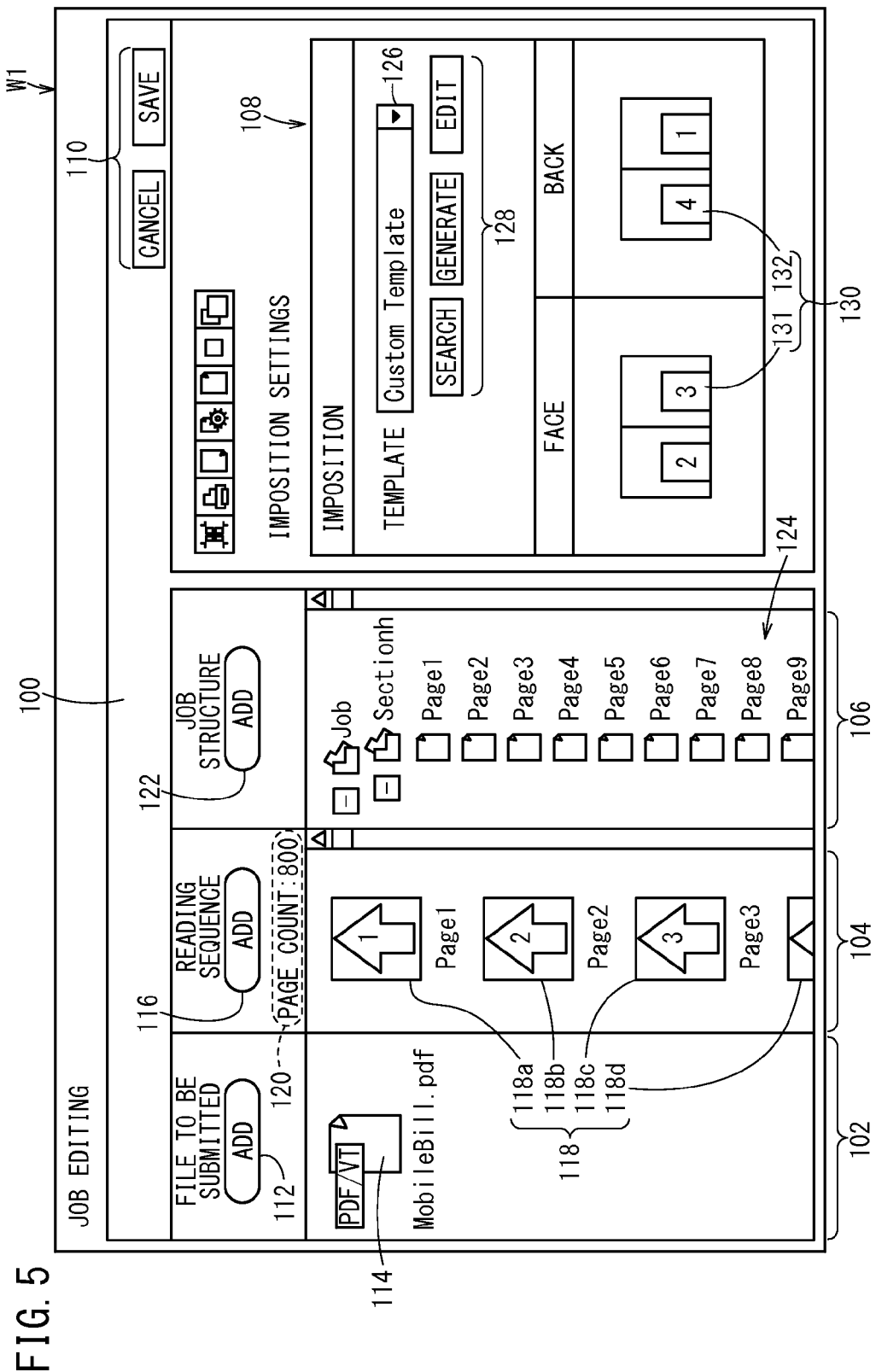
FIG. 5 is a view showing a job editing screen for normal printing.

The display data generator 58 has an editing mode acquirer 68 for acquiring a present editing mode and a screen generator 70 for generating display data for a job editing screen 100 (FIG. 5, etc.). The display data may comprise image data generated by application software, or may comprise various parameters for utilizing an API (Application Programming Interface) function provided by basic software.

The imposition data generator 60 generates imposition data 54 on which the contents of settings made by the variable data printing setter 56 are reflected. As described later, the imposition data 54 are data representing a common and single page layout made up of the number of common pages.

[Structural Example of PDF/VT Data]

PDF/VT (Portable Document Format/Variable Transactional) refers to an international standard for the handling of variable data•transaction documents, and is defined by ISO (International Standard Organization) 16612-2:2010.

FIG. 3 shows a data structure that is grasped from the PDF/VT data 52 shown in FIG. 2. In FIG. 3, the data structure includes record information 80 that stores a succession of 100 records, which are numbered (i.e., the record numbers of 1 to 100), each made up of 8 pages. In the data structure, variable data printing is assumed for producing a product having two signatures that are side-stitched. Each of the signatures is obtained by folding a print 28 with two pages printed on each of its face and back, into a valley fold.

The data structure also includes page layout information 82 that stores a succession of 200 sheets, which are numbered (i.e., the sheet numbers of 1 to 200), each made up of 4 pages. On each sheet, four types of pages are regularly assigned in the sequence: [1] back (B) and right side (R), [2] face (F) and left side (L), [3] face (F) and right side (R), [4] back (B) and left side (L).

[Operation of Imposition Apparatus 20]

The imposition apparatus 20 according to the present embodiment is constructed as described above. Operation of the imposition apparatus 20 shown in FIGS. 1 and 2 will be described in detail below primarily with reference to a flowchart shown in FIG. 4.

Prior to the operation sequence, the imposition apparatus 20 displays a job editing screen 100 that is used to make settings for an imposing process. In response to an instruction to start making settings, the screen generator 70 generates display data for the job editing screen 100, and then supplies the generated display data to the display controller 44. The display controller 44 controls the display unit 46 to display a window W1 including the job editing screen 100.

As shown in FIG. 5, the job editing screen 100 includes a first setting field 102, a second setting field 104, a third setting field 106, a fourth setting field 108, and a button group 110 having buttons indicated as "CANCEL" and "SAVE". The user of the imposition apparatus 20, also referred to as the operator, can operate the input unit 48 (FIG. 2) to make various settings through the various setting fields.

The first setting field 102 includes a button 112 indicated as "ADD" in its upper area. The "ADD" button 112 is clicked on, whereby a data file to be imposed can be added. In FIG. 5, an icon 114 having a file name "MobileBill.pdf" is displayed in the first setting field 102.

The second setting field 104 includes a button 116 indicated as "ADD" in its upper area. The "ADD" button 116 is clicked on, whereby a page to be read can be added. In FIG. 5, four thumbnails 118, or more specifically, a thumbnail 118a representing a first page, a thumbnail 118b representing a second page, a thumbnail 118c representing a third page, and a thumbnail 118d representing a fourth page, are displayed in the order named from above in the second setting field 104. The total number of pages (=800) of the file "MobileBill.pdf" is displayed in a field 120 positioned directly below the "ADD" button 116.

The third setting field 106 includes a button 122 indicated as "ADD" in its upper area. The "ADD" button 122 is clicked on, whereby a section of the job structure can be added. The third setting field 106 also includes a hierarchical menu 124 which displays all the pages (800 pages) on the same hierarchical level. In FIG. 5, only some pages, i.e., page 1 through page 9, are displayed due to dimensional limitations of the third setting field 106.

The fourth setting field 108 includes a pulldown menu 126, a button group 128 having buttons indicated as "SEARCH", "GENERATE", "EDIT", and a template image 130 of both sides including a face image 131 and a back image 132. In FIG. 5, the template image 130 represents an imposition pattern titled "Custom Template" according to a 2-up imposition, double-sided printing process. The imposition pattern of the template image 130 can be updated in response to update operation through the pulldown menu 126.

In step S1 shown in FIG. 3, it is judged whether an instruction to start making settings for variable data printing has been received or not. In a case where no instruction is received, control stays in step S1. In a case where the instruction has been received, control goes to step S2.

In step S2, the individual page count acquirer 62 reads PDF/VT data 52 for use in variable data printing from the memory 50 or the like, and analyzes the contents of the PDF/VT data 52. The individual page count acquirer 62 acquires the numbers of pages that make up the respective records as respective individual page counts. In the data structure shown in FIG. 3, the individual page count acquirer 62 acquires the number of pages "8", which is common to all the records, as the respective individual page counts.

In step S3, the common page count determiner 64 determines the maximum page count among the individual page counts acquired in step S2, as a common page count. In the data structure shown in FIG. 3, since all the individual page counts for the record numbers 1 through 100 are "8", the common page count determiner 64 determines "8" as the common page count.

FIG. 6 shows a data structure which has been changed from the data structure shown in FIG. 3. The data structure shown in FIG. 6 includes record information 80 which is the same as the record information 80 shown in FIG. 3 and will not be described below. The data structure shown in FIG. 6 also includes page layout information 84 which corresponds to the layout information about a common and single record. Specifically, the page layout information 84 stores two sheets, whose sheet numbers are indicated as C1, C2, each made up of four pages. On each of the sheets indicated by the sheet numbers C1, C2, the four pages are regularly assigned in the sequence: [1] back (B) and right side (R), [2] face (F) and left side (L), [3] face (F) and right side (R), [4] back (B) and left side (L).

In step S4, the editing mode acquirer 68 acquires an editing mode that is being currently designated. As with general-purpose printing settings, variable data printing settings include a "job editing mode" for editing a job and an "imposition editing mode" for editing an imposition template. In a case where the "job editing mode" is designated, for example, the imposition apparatus 20 continuously displays a job editing screen 100 that is titled "JOB EDITING", in step S5.

Figure 7:
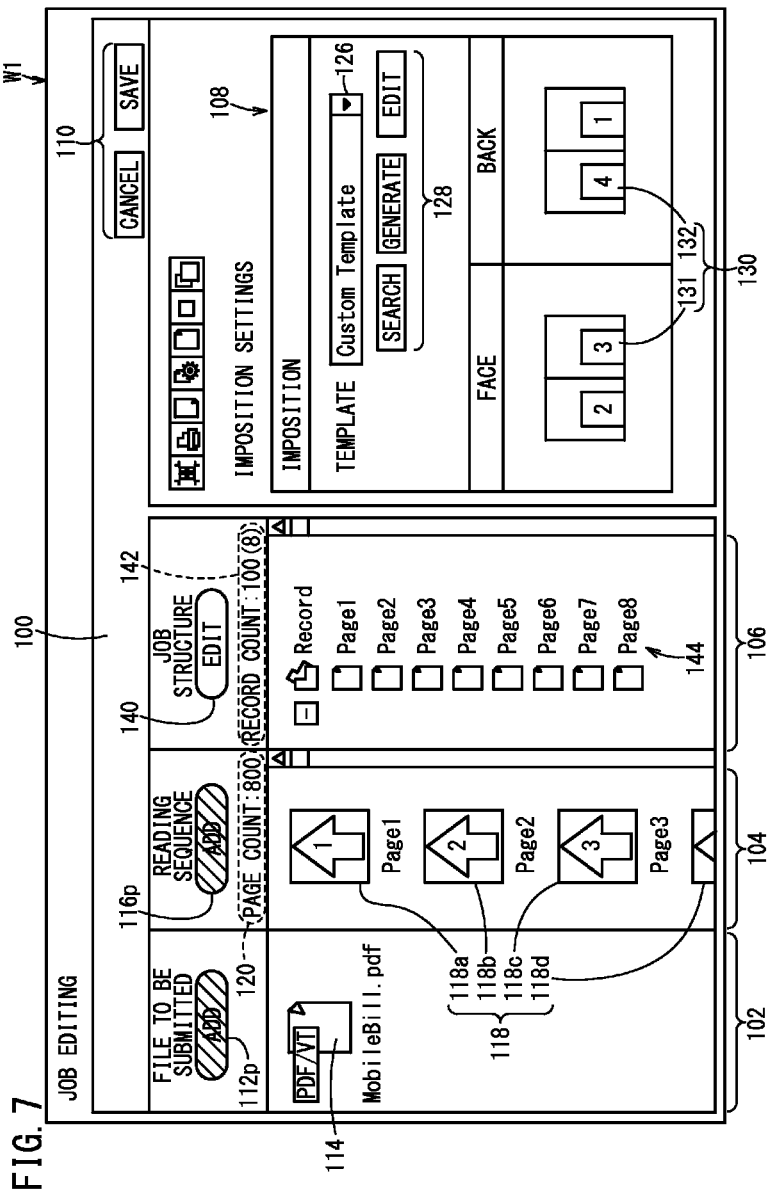
FIG. 7 is a view showing a job editing screen for variable data printing.

As shown in FIG. 7, the job editing screen 100 includes a first setting field 102, a second setting field 104, a third setting field 106, a fourth setting field 108, and a button group 110, as with the job editing screen 100 shown in FIG. 5. In the case of the variable data printing settings, the job editing screen 100 shown in FIG. 7 has some displayed items different from those of the job editing screen 100 according to the general-purpose printing settings shown in FIG. 5.

For example, the first setting field 102 has an "ADD" button 112p and the second setting field 104 has an "ADD" button 116p. These "ADD" buttons 112p, 116p are displayed as passive buttons (i.e., in an inoperable state). The third setting field 106 has an "EDIT" button 140 instead of the "ADD" button 122 (FIG. 5). The "EDIT" button 140 is clicked on, whereby the common page count (=8) determined in step S3 can be manually changed.

The third setting field 106 further includes a field 142 directly below the "EDIT" button 140, and "RECORD COUNT: 100 (8)" is newly displayed in the field 142, indicating that the total number of records is "100" and the common page count is "8". The third setting field 106 also includes a hierarchical menu 144 which displays pages (Page 1 through Page 8) that make up one record. A face image 131 schematically represents the form of a sheet indicated by the sheet number C1, and a back image 132 schematically represents the form of a sheet indicated by the sheet number C2.

In step S7, the variable data printing setter 56 judges whether it has received an instruction to save the settings or not. Specifically, the variable data printing setter 56 judges whether the button group 110, particularly the "SAVE" button, has been clicked on or not. In a case where the button group 110 has not been clicked on, control goes back to step S4 to repeat steps S4 through S6.

In a case where the "imposition editing mode" is designated in step S4, then the imposition apparatus 20 continuously displays an imposition editing screen 150 (FIG. 8) that is titled "IMPOSITION VIEW" in step S6.

Referring back to FIG. 7, the button group 128, particularly the "EDIT" button, is clicked on, whereby the screen generator 70 generates display data for an imposition editing screen 150, and supplies the generated display data to the display controller 44. The display controller 44 controls the display unit 46 to display another window W2 which includes the imposition editing screen 150.

As shown in FIG. 8, the imposition editing screen 150 includes an icon group 152, an imposition display field 154, a thumbnail display field 156, a fourth setting field 158, and a button group 160 having buttons indicated as "UPDATE", "CLOSE", and "SAVE". The operator can make various settings on the imposition editing screen 150 by operating the input unit 48 (FIG. 2).

The imposition display field 154 displays a preview image 162 on a sheet. The operator can use an indication field 164 positioned above the imposition display field 154 to designate a record number ("R" in an upper position) or a sheet number ("S" in a lower position) to be displayed.

The thumbnail display field 156 displays thumbnail images 165, 166 corresponding to the preview image 162. In a case where there are a plurality of thumbnail images 165, 166 displayed, the operator can select one of them to call up the imposition pattern of the sheet corresponding to the selected thumbnail image into the imposition display field 154.

The fourth setting field 158 includes an icon group 167 and three check boxes 168, 169, 170. The operator can set various parameters about the imposing process through the check boxes 168, 169, 170.

In a case where an icon 172 (FIG. 8) for selecting a normal mode is in an ON state, the imposition editing screen 150 shown in FIG. 8 is displayed. On the other hand, an icon 174 is clicked on, whereby the icon 174 is brought into an ON state, and as a result, the C & S mode is selected. The C & S mode is an editing mode for cut and stack.

In response to the selection operation of the "C & S" mode, the sheet count calculator 66 calculates a minimum number of sheets by which each record can be printed, based on the number of pages assigned to one sheet, the total number of records, and the common page count. A specific example of the calculation of the minimum number of sheets for printing each record will be described below.

It is assumed that a 4-up imposition print 28 is cut into halves and the 2-up imposition sheets are stacked. It is also assumed that the number of pages assigned per sheet is "8", the total number of records is "100", and the common page count is "8". In this case, the minimum number of sheets is calculated as (common page count)×(total number of records)/(number of assigned pages)=8×100/8=100.

FIG. 9 shows an imposition editing screen 150 in the S & C mode. As shown in FIG. 9, the imposition editing screen 150 includes an icon group 152, an imposition display field 154, a thumbnail display field 156, a C & S setting field 176, and a button group 160, which are similar to some of the items displayed on the imposition editing screen 150 shown in FIG. 8. Some displayed items in the C & S mode shown in FIG. 9 are different from those in the normal mode shown in FIG. 8.

For example, the imposition display field 154 displays a preview image 178 in a layout for cut and stack. The thumbnail display field 156 displays a thumbnail image 180 corresponding to the preview image 178.

The C & S setting field 176 includes a group table 182 with respect to cut and stack, and a button group 184 having buttons indicated as "NEW GROUP" and "DELETE". The group table 182 displays group numbers, group names, and sheet counts. Initially, one group "Cut & Stack" is generated, and the sheet count thereof agrees with a value calculated by the sheet count calculator 66. The operator can click on the button group 184 to change the number of groups for cut and stack or the distribution of sheet counts.

Figure 4:
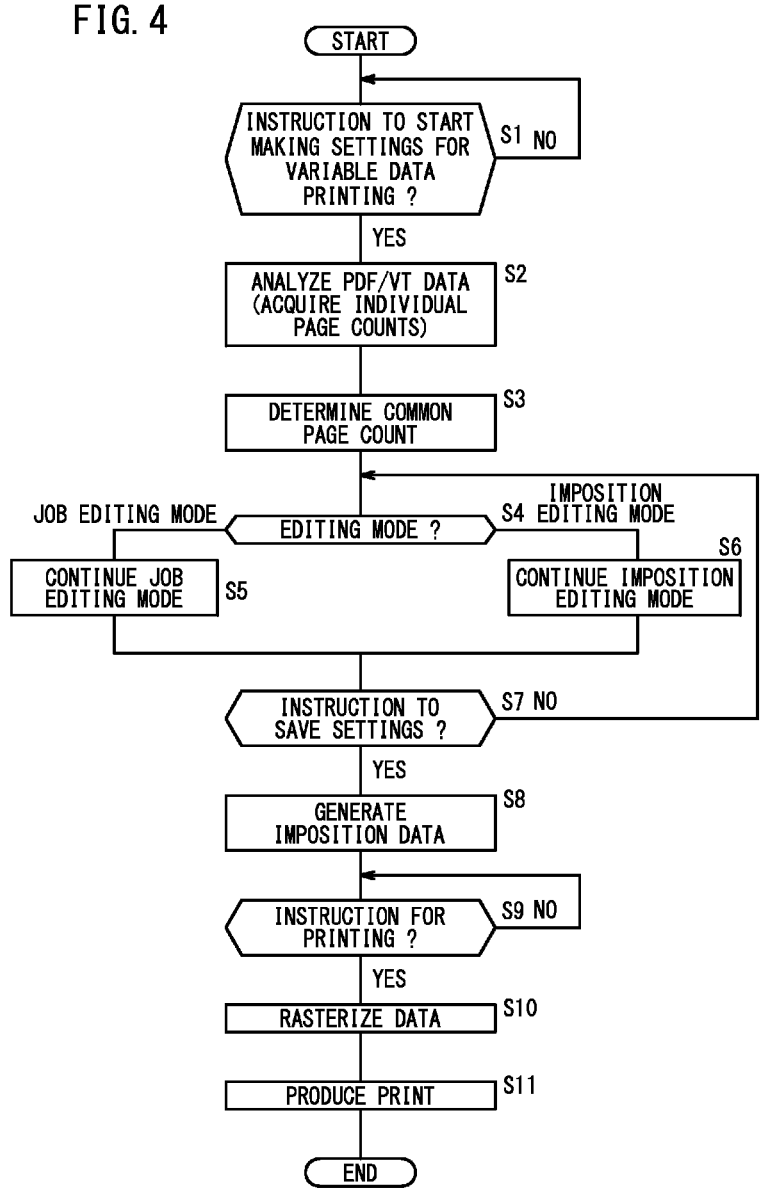
FIG. 4 is a flowchart of an operation sequence of the imposition apparatus shown in FIGS. 1 and 2.

In step S7 in FIG. 4, in a case where the variable data printing setter 56 judges that the button group 110 in FIG. 5 or 7 (particularly the "SAVE" button) has been clicked on, i.e., it has received an instruction to save the settings, control goes to step S8.

In step S8, the imposition data generator 60 generates imposition data 54 representing the imposition information finalized in steps S1 through S7. Specifically, the imposition data generator 60 generates imposition data 54 that indicate a page layout of one or more signatures. In the imposition data 54, the record information 80 is linked to the sheet information 86.

Thereafter, the imposition data generator 60 stores and saves the imposition data 54 in the memory 50. The imposition apparatus 20 may then send out the imposition data 54 through the communication I/F 42 so that the server 16 will hold the imposition data 54.

In step S9, the controller 40 judges whether there is an instruction for printing from the operator or not. In a case where there is no instruction for printing, then control stays in step S9. In a case where there is an instruction for printing, then control goes to step S10.

In step S10, the RIP apparatus 22 rasterizes imposed page description data, and supplies the rasterized page description data as printing data to the digital printing press 30. Specifically, the RIP apparatus 22 rasterizes imposed page description data for one record, then performs a differential process required for variable data printing on the rasterized page description data, and supplies the processed page description data as printing data to the digital printing press 30. In this manner, the variable data printing process is simplified and speeded up.

In step S11, the digital printing press 30 produces a print 28 per record based on the printing data processed and supplied thereto in step S10.

In the example shown in FIG. 6, the numbers of pages that make up the respective records are identical to each other. The present invention is also applicable to different numbers of pages that make up records.

Figures 10A, 10B:
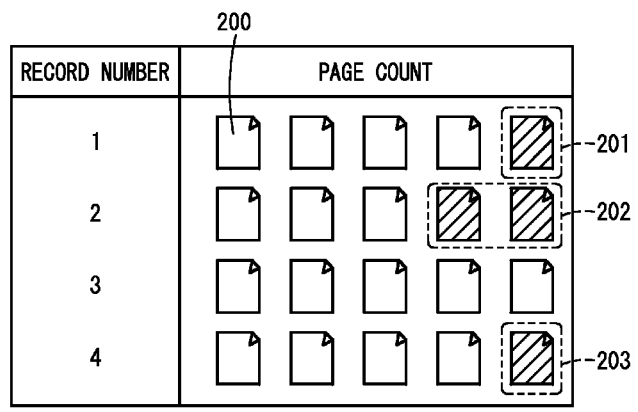
FIGS. 10A and 10B are views illustrating a process for processing records made up of different numbers of pages.

FIGS. 10A and 10B illustrate a process for processing records made up of different numbers of pages. As shown in FIG. 10A, a record indicated by a record number "1" is made up of four contents pages 200, and a record indicated by a record number "2" is made up of three contents pages 200. A record indicated by a record number "3" is made up of five contents pages 200, and a record indicated by a record number "4" is made up of four contents pages 200. In this case, the common page count determiner 64 determines "5" which is the maximum number of pages among the individual page counts, as a common page count.

Then, as shown in FIG. 10B, one blank page 201 is produced in the record indicated by the record number "1", two blank pages 202 are produced in the record indicated by the record number "2", and one blank page 203 is produced in the record indicated by the record number "4".

The imposition data generator 60 generates imposition data 54 by inserting the blank pages 201 through 203 into the respective records to make up for the lacking pages in a case where their individual page counts are smaller than the common page count. More specifically, the imposition data generator 60 changes the page numbers of the record information 80 (see FIG. 6) depending on the common page count, and associates corresponding page description data to the blank pages 201 through 203.

Therefore, even in a case where the numbers of pages that make up respective records are different from each other, a desired variable data printing process can be carried out. The above process is performed after the common page count has been changed through the "EDIT" button 140, after the button group 110 ("SAVE" button) has been clicked on, or at other timings.

Advantages of the Present Embodiment

As described above, the imposition apparatus 20 includes the individual page count acquirer 62 which acquires the numbers of pages making up respective records as individual page counts by analyzing the PDF/VT data 52 used for variable data printing, the common page count determiner 64 which determines, as a common page count, the maximum page count among the individual page counts, and the imposition data generator 60 which generates imposition data 54 representing common and single page layout information 84 made up of the common page count.

Since the maximum page count among the individual page counts is determined as a common page count, and imposition data 54 representing a common and single page layout made up of the common page count are generated, it is enough to handle an amount of data corresponding to one record, and the imposition data 54 for variable data printing can be generated highly efficiently from the standpoint of data management and processing.

The present invention is not limited to the illustrated embodiment, but many changes and modifications can be made to the embodiment without departing from the scope of the present invention.

What is claimed is:

1. A data generating apparatus comprising:
   one or more processors configured to operate as:
   an individual page count acquirer for acquiring, as individual page counts, numbers of pages making up respective records, by analyzing page description data used for variable data printing;
   a common page count determiner for determining, as a common page count, a maximum page count among the individual page counts acquired by the individual page count acquirer; and
   an imposition data generator for generating imposition data representing a common and single page layout made up of the common page count determined by the common page count determiner,
   wherein the imposition data generator generates the imposition data that indicate the page layout of a plurality of signature for enhancing efficiency of the one or more processors for printing the records having a variable number of pages, and the one or more processors further operating as:
   a sheet count calculator for calculating a minimum number of sheets by which each of the records can be printed, based on a number of pages assigned to one sheet, a total number of records, and the common page count to minimize a number of sheets while printing the records.

2. The data generating apparatus according to claim 1, wherein the imposition data generator generates the imposition data by inserting blank pages into the respective records to make up for lacking pages in a case where the individual page counts are smaller than the common page count.

3. A data generating method for enabling a computer to perform using one or more processors, the steps of:
   acquiring, as individual page counts, numbers of pages making up respective records, by analyzing page description data used for variable data printing;
   determining, as a common page count, a maximum page count among the acquired individual page counts; and
   generating imposition data representing a common and single page layout made up of the determined common page count,
   wherein the step of generating generates the imposition data that indicate the page layout of a plurality of signatures for enhancing efficiency of the one or more processors for printing the records having a variable number of pages, and the one or more processors further performing
   calculating a minimum number of sheets by which each of the records can be printed, based on a number of pages assigned to one sheet, a total number of records, and the common page count to minimize a number of sheets while printing the records.

4. The data generating method according to claim 3, wherein the step of generating generates the imposition data by inserting blank pages into the respective records to make up for lacking pages in a case where the individual page counts are smaller than the common page count.

5. A non-transitory storage medium storing a program for enabling a computer to perform, using one or more processors, the steps of:
   acquiring, as individual page counts, numbers of pages making up respective records, by analyzing page description data used for variable data printing;
   determining, as a common page count, a maximum page count among the acquired individual page counts; and
   generating imposition data representing a common and single page layout made up of the determined common page count,
   wherein the step of generating imposition data generates the imposition data that indicate the page layout of a plurality of signatures for enhancing efficiency of the one or more processors for printing the records having a variable number of pages, and the one or more processors further performing:
   calculating a minimum number of sheets by which each of the records can be printed, based on a number of pages assigned to one sheet, a total number of records, and the common page count to minimize a number of sheets while printing the records.

6. The apparatus of claim 1, wherein the plurality of signatures have at least one of a different page layout and a different page folding from another of the plurality of signatures.

* * * * *